(No Model.)
A. O. MORFORD.
RAILROAD SPIKE.
No. 319,602. Patented June 9, 1885.
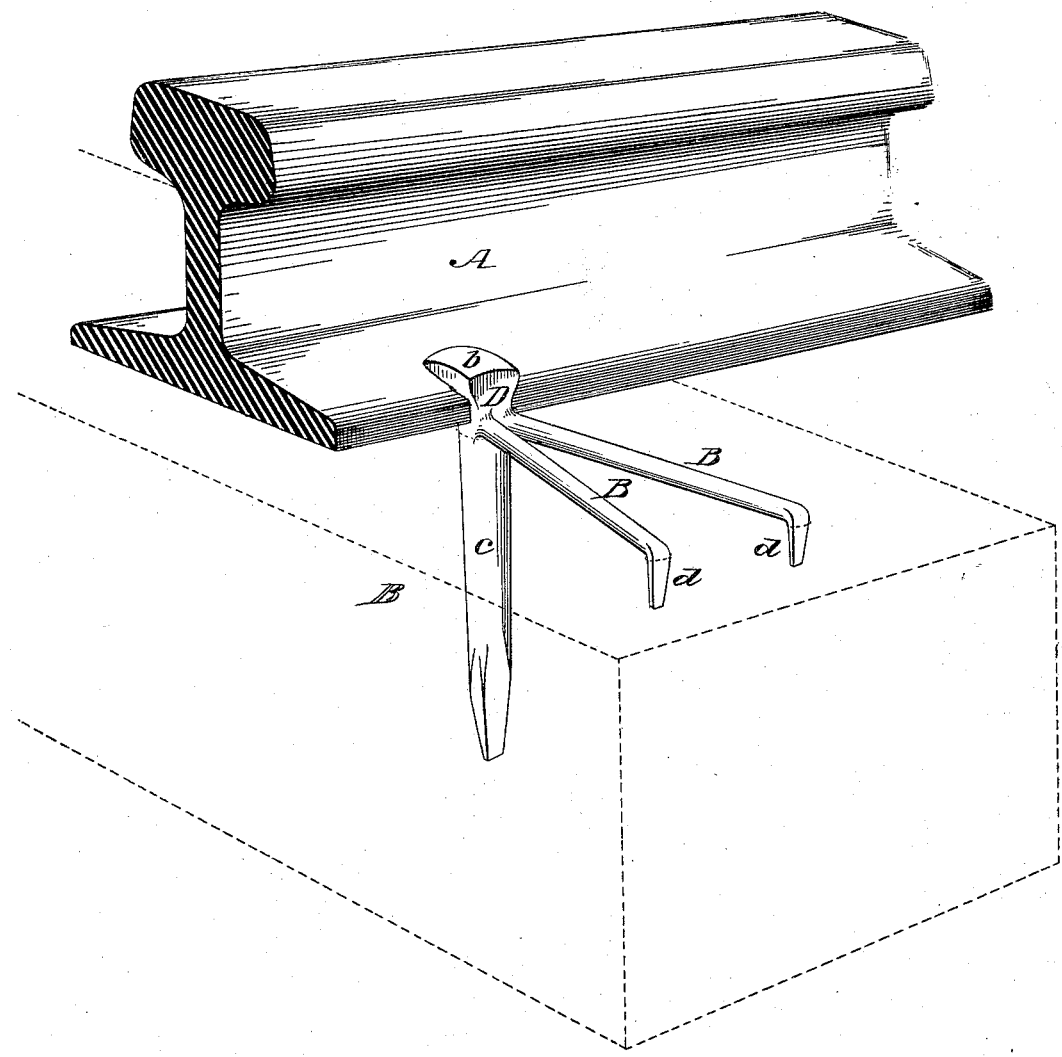
WITNESSES:
INVENTOR:
A. O. Morford
BY Munn & Co
ATTORNEYS.

UNITED STATES PATENT OFFICE.

ABRAHAM O. MORFORD, OF PORT CHESTER, NEW YORK.

RAILROAD-SPIKE.

SPECIFICATION forming part of Letters Patent No. 319,602, dated June 9, 1885.

Application filed January 15, 1885. (No model.)

*To all whom it may concern:*

Be it known that I, ABRAHAM O. MORFORD, of Port Chester, in the county of Westchester and State of New York, have invented certain new and useful Improvements in Railroad-Spikes, of which the following is a full, clear, and exact description.

This invention relates to spikes for securing railroad-rails, and has more especially for its object the better hold of the spike to its place in the sleeper on which the rail rests, and consequent more secure hold of the rail. Its principal duty is to correct that insecure hold of the spike when driven home caused by the splitting of the sleeper by the shank of the spike, and to this and other ends the spike is constructed with two claws or anchoring-arms suitably pointed or shaped to enter into the sleeper, and arranged not only to extend outwardly from the rear of the shank of the spike, but also laterally in relation to the rear of said shank and so that the entering end or ends of said claw or claws will be to the side of or out of line with the back of the spike, and so out of line with any split in the sleeper which the shank in driving the spike home may have produced. This will give a firm anchored attachment of the spike to the sleeper and secure hold of the head of the spike on the rail in event of any looseness of the shank in its hole owing to the splitting of the sleeper by the shank, and where duplicate claws are used diverging in opposite directions the effect is greatly increased. Such construction of the spike, while it also provides for greater resistance to the lateral pressure of the rails and to any drawing action of the spikes, essentially differs from another construction of spike having such last-named objects in view, and made with an extended head provided with side ledges and with a short inflexible stud on its under side, and arranged to enter the wood or sleeper at some distance from the shank, but in like line with it transversely to the rail, and consequently in the line of any split that the shank of the spike, when driven home, may produce in the sleeper.

Reference is to be had to the accompanying drawing, forming part of this specification, in which the figure represents a view in perspective of a spike embodying my invention as applied to a railroad-rail, and showing by dotted lines a sleeper which carries the rail or to which it is secured by the spike.

A indicates a railroad-rail in part, B a sleeper in part on which said rail is secured, and D a spike embodying the invention applied to said rail and sleeper.

The head *b* of the spike may be of the ordinary or any suitable construction, as may also its shank *c*.

B' B' are two claws or anchoring-arms forming integral portions of the spike and arranged not only to extend outwardly from the rear of the shank of the spike near its head end, but also laterally in relation to the rear of said shank or in diverging relation with each other from the shank, causing the spike to be triangularly braced, and so that their outer bent ends or engaging points or projections *d*, which in driving home the spike are made to enter the sleeper, will be to the side or opposite sides of the shank of the spike, and so out of line of any split in the sleeper which the shank of the spike in being driven home may produce, thus firmly securing and anchoring the spike and the rail held by the spike, as hereinbefore referred to.

Having thus described my invention, what I claim as new, and desire to secure by Letters Patent, is—

1. A railroad-spike provided with duplicate engaging points or projections in rear of and at a distance from the shank of the spike on opposite sides thereof, essentially as specified.

2. A railroad-spike having duplicate claws or anchoring-arms B', arranged to diverge outwardly relative to the back or outer side of the shank *c* of the spike and provided with downwardly-bent outer entering ends or portions *d*, essentially as shown and described.

ABRAHAM O. MORFORD.

Witnesses:
C. SEDGWICK,
EDWD. M. CLARK.